United States Patent [19]

Kibbel, Jr. et al.

[11] 3,873,685

[45] Mar. 25, 1975

[54] CONTIGUOUS SHAPED CHLORINE RELEASING STRUCTURE

[75] Inventors: William H. Kibbel, Jr., Pennington; Roger C. Hollenbach, Kendall Park, both of N.J.

[73] Assignee: FMC Corporation, New York, N.Y.

[22] Filed: Sept. 10, 1973

[21] Appl. No.: 395,612

[52] U.S. Cl. ................ 424/16, 424/149, 424/249
[51] Int. Cl. ....... A61j 3/10, A61k 9/00, A61k 27/12
[58] Field of Search ..................... 424/16, 149, 249

[56] References Cited
UNITED STATES PATENTS

| | | | |
|---|---|---|---|
| 701,438 | 6/1902 | Whyte | 424/16 |
| 2,913,460 | 11/1959 | Brown et al. | 252/95 |
| 3,035,057 | 5/1962 | Symes et al. | 252/95 |
| 3,120,378 | 2/1964 | Lee et al. | 252/95 |
| 3,342,674 | 9/1967 | Kowalski | 424/149 X |
| 3,429,821 | 2/1969 | Weinstein et al. | 252/97 |

FOREIGN PATENTS OR APPLICATIONS

| | | |
|---|---|---|
| 1,165,098 | 7/1971 | United Kingdom |
| 6,904,056 | 12/1969 | South Africa |
| 1,537,311 | 8/1968 | France |
| 1,472,680 | 3/1967 | France |

*Primary Examiner*—Shep K. Rose

[57] ABSTRACT

Process for producing a contiguous, shaped-structure containing physically discrete components of sodium dichloroisocyanurate dihydrate and trichloroisocyanuric acid which comprises compressing discrete portions of these components together in a structure forming apparatus at a pressure of about 2,000 to about 25,000 p.s.i.

2 Claims, No Drawings

CONTIGUOUS SHAPED CHLORINE RELEASING STRUCTURE

This invention relates to a process of producing contiguous, shaped-structures containing sodium dichloroisocyanurate dihydrate and trichloroisocyanuric acid.

Chlorine-releasing agents that give off available chlorine when placed in water have been used as bactericides to kill bacteria and to prevent their growth in swimming pools, portable water supplies and the like. Chlorination has been accomplished by a variety of means using gaseous chlorine, solutions of chlorine-releasing agents, and solid forms of agents which release chlorine. The safest and most popular chlorine-releasing agents used are solid compositions, which may be in either granular or tabletted form. Tablets are preferred over granular materials because they obviate the need for measuring cups and eliminate the problem of spillage and storage of bulky materials.

The tabletted chlorine-releasing agents so far produced, have been either rapid-dissolving or slow-dissolving. Rapid-dissolving tablets are effective in supplying available chlorine quickly to swimming pool water, for example, in response to changing chlorine demands put upon the pool water. They are also effective in superchlorinating pool water. Superchlorination results in the decomposition of dirt or residues formed from undesirable organic matter present in pool water.

Slow-dissolving tablets, on the other hand, are effective in maintaining available chlorine in pool water at a given rate over long periods of time. These materials prevent the growth of bacteria present in pool water.

Tabletted anhydrous sodium dichloroisocyanurate is an example of a chlorine-releasing agent that is rapid-dissolving. Anhydrous sodium dichloroisocyanurate tablets which have physical properties suitable for packaging and shipping are formed only with difficulty under high pressures (around 60,000 p.s.i.). Use of high pressures, however, results in some decomposition of the anhydrous material causing a decrease of available chlorine in the final product. Even when formed, these tablets are not dimensionally stable; that is, they swell and develop structurally weak efflorescent structures upon prolonged exposure to high humidities or small amounts of moisture. Furthermore, compositions containing anhydrous sodium dichloroisocyanurate have been successfully tabletted only when a lubricant such as boric acid (see U.S. Pat. No. 3,120,378) or stabilizers such as boron oxide and sodium carbonate (see French Pat. No. 1,537,311) have been employed during the molding process. Such additives are objectionable in-so-far as they act as diluents and thereby decrease the available chlorine content of the compositions. The additives also act as impurities which are often undesirable.

These processes do not overcome the basic drawbacks of tabletting anhydrous sodium dichloroisocyanurate, namely, that it does not tablet easily at conventional pressures of about 15,000 to about 25,000 p.s.i. Consequently, the above processes are not commercially feasible since the pressures needed to tablet the anhydrous material to produce a satisfactory tablet put excessive strain on the tabletting machinery causing extensive wear thereof, and result in decomposition of the chlorine-releasing agent.

Nevertheless, if tablets are manufactured by compressing anhydrous sodium dichloroisocyanurate at high pressures and such tablets are used to superchlorinate pool water, continuous testing of the available chlorine content of the water must be performed in order to calculate the proper number of tablets to be used. This process lacks simplicity and convenience since it requires a superchlorination schedule and dosage different from routine chlorine maintenance schedules and dosages.

Tabletted trichloroisocyanuric acid and tabletted calcium hypochlorite are examples of slow-dissolving chlorine-releasing tablets. These tablets have dissolution times ranging from hours to days which permits the release of chlorine at one specific rate over long periods of time. This slow solubility rate, however, has insufficient flexibility to permit the tablets to be effective as a bactericide in responding to rapid changes in chlorine demands put on pool water occasioned by variations in climate or swimmer load. In addition, calcium hypochlorite tablets do not maintain dimensional and structural stability upon prolonged exposure to small amounts of moisture or to high humidity environments, such as around swimming pools.

As a result of the deficiencies of both the rapid- and slow-dissolving chlorine-releasing agents, there is a need for some simple, safe, and convenient manner to chlorinate water, not requiring constant attention and maintenance. There is also a need for a chlorine-releasing agent which will permit the rapid release of available chlorine to meet the rapidly changing chlorine demands placed upon pool water, and which will simultaneously permit the slow-release of available chlorine to maintain available chlorine levels over long periods of time in the pool water.

The present invention comprises a commercially effective process for producing a structure which combines both rapid- and slow-dissolving chlorine-releasing agents. This combination of chlorine-releasing agents has not been possible heretofore.

The inventive structure is a contiguous, shaped-structure which contains physically discrete components of sodium dichloroisocyanurate dihydrate as the rapid-dissolving compound and trichloroisocyanuric acid as the slow-dissolving compound. The contiguous, shaped-structures of this invention are prepared by compressing discrete portions of sodium dichloroisocyanurate dihydrate and trichloroisocyanuric acid together in a structure forming apparatus, such as a mold, press or die, at a compression pressure between about 2,000 and about 25,000 p.s.i. The shaped-structures of this invention are structurally-strong, storage-stable and resist structural changes due to moisture. They form easily without lubricants or stabilizers and maintain their dimensional stability for extended periods of time. Furthermore, they are produced without loss of available chlorine. The contiguous, shaped-structures of this invention provide the consumer with maximum simplicity, desired convenience, minimum attentive features, and the assurance of a continuous sanitary swimming pool; these advantages have previously not been available with other chlorine sources.

The inventive shaped-structures must be contiguous, that is, they must contain physically discrete components of sodium dichloroisocyanurate dihydrate and trichloroisocyanuric acid. Homogeneous mixtures of these compounds that are pressed into shaped-structures are not rapid- and slow-dissolving since the dissolving rate of these mixtures depends upon the dissolving rate of the slow-dissolving material.

The inventive contiguous, shaped-structures are produced in any predetermined geometric shape. The geometric shape, however, must be a shape which permits the rapid release of available chlorine for superchlorination as well as the simultaneous or subsequent slow release of available chlorine for routine maintenance. Geometric shapes which meet this criteria are either layered tablets, or tablets or structures having an inner core and outer layer; such as a rod or oval ball.

When preparing the contiguous, shaped-structures of this invention in the form of a layered tablet, sodium dichloroisocyanurate dihydrate and trichloroisocyanuric acid are added separately to the structure forming apparatus. This is achieved by adding either sodium dichloroisocyanurate dihydrate or trichloroisocyanuric acid to the structure forming apparatus and then dispersing the other compound onto the compound already in the structure forming apparatus without mixing the two compounds together. Pressure is then applied to the structure forming apparatus to form the inventive chlorine-releasing, contiguous, shaped-structures. When a tablet is made in this manner and added to an aqueous solvent, the rapidly-soluble solution dichloroisocyanurate dihydrate quickly releases its available chlorine to superchlorinate the water, while the slowly-soluble trichloroisocyanuric acid gradually releases its available chlorine over long periods of time to maintain routine chlorination.

When preparing the contiguous, shaped-structures of this invention in the form of a geometric shape that has an inner core and outer layer, the slowly-soluble trichloroisocyanuric acid must comprise the inner core while the rapidly-soluble sodium dichloroisocyanurate dihydrate must comprise the outer layer. This arrangement is essential so that when these inventive shaped-structures are added to an aqueous solvent, the rapidly-soluble sodium dichloroisocyanurate dihydrate quickly releases its available chlorine to the water. This arrangement permits the water to be quickly and adequately superchlorinated. Only after the rapidly-soluble material dissolves away from the inner core will the slowly-soluble trichloroisocyanuric acid gradually release its available chlorine over long periods of time.

Structures which contain an inner core of sodium dichloroisocyanurate dihydrate are completely unsatisfactory. These structures do not achieve superchlorination quickly and adequately since the slowly-soluble trichloroisocyanuric acid must be dissolved away before the rapidly-soluble material can be dissolved. Furthermore, cracks or fissures in the outer layer may result in premature dissolving of the rapidly-soluble inner core sodium dichloroisocyanurate dihydrate resulting in high levels of available chlorine. These high levels of available chlorine are objectionable in that they irritate the eyes and mucous membranes of the swimmers.

Any apparatus which is used conventionally to produce layered or cored shaped-structures may be employed in this invention to produce the inventive contiguous, shaped-structures. Such apparatus is well known in the art. The use of standard dies is eminently satisfactory without special provision for rotation of the dies during the pressing operation.

The pressures used to form the contiguous, shaped-structures of this invention depends upon the desired rate at which the shaped-structures are to dissolve. This rate is called the "solubility rate" and is the time it takes a shaped-structure (1 inch diameter by ⅜ inch thick) to dissolve and escape from a ½ inch stainless steel mesh cage immersed in 1 liter of swirling distilled water at 20°C. In general, the pressures will range from about 2,000 to about 25,000 p.s.i., and preferably from 15,000 to 20,000 p.s.i. Under laboratory test conditions, pressures of around 20,000 p.s.i. produce contiguous, shaped-structures having a rapid-solubility rate around 15 minutes and a slow-solubility rate around 10 hours. Under field test conditions these same shaped-structures had the same rapid-solubility rate of around 15 minutes but their slow-solubility rate increased from 10 hours to a few days.

Pressures below about 2,000 p.s.i. do not produce an acceptable shaped-structure. These structures are difficult to remove from the die, they have weak corners, and poor structural strength or hardness. Pressures above about 25,000 p.s.i. put excessive amounts of strain on the apparatus causing wear to the structure forming apparatus. Furthermore, these pressures also result in some decomposition of both the sodium dichloroisocyanurate dihydrate and trichloroisocyanuric acid causing a decrease in available chlorine in the final product.

The solubility rate of the shaped-structures of this invention can also be changed when the pressure is maintained constant by increasing the amount of trichloroisocyanuric acid used in the shaped-structures relative to the amount of sodium dichloroisocyanurate dihydrate. A weight ratio of 8 parts of sodium dichloroisocyanurate dihydrate to 1 part trichloroisocyanuric acid is necessary for 1 day of superchlorination and 1 day of routine chlorination. Up to 8 days of routine chlorination and 1 day of superchlorination can be obtained by employing a weight ratio of 1 part of sodium dichloroisocyanurate dihydrate to 1 part of trichloroisocyanuric acid.

Increasing the amount of trichloroisocyanuric acid used per shaped-structure thus increases the time it takes all of the trichloroisocyanuric acid to completely dissolve. Increasing the dissolving time causes a corresponding increase in routine chlorine maintenance time when the shaped-structures are added to an aqueous solution. However, increasing the amount of sodium dichloroisocyanurate dihydrate above that necessary for superchlorination does not achieve any added benefits since the amount of sodium dichloroisocyanurate dihydrate used is that amount which will achieve super-chlorination.

On the basis of field tests, it was determined that a 10,000 gallon pool requires 0.75 ppm available chlorine/day (supplied from approximately 1 ounce of trichloroisocyanuric acid) for routine chlorination, and five times the amount of routine available chlorine/day for superchlorination (supplied from approximately 5 ounces of sodium dichloroisocyanurate dihydrate). When a 1 inch diameter by ⅜ inch thick layered tablet (compression pressure was 20,000 p.s.i.) weighing 15 grams (0.525 ounce) is used to provide available chlorine according to the invention, the period of routine chlorination can be varied according to Table I.

TABLE I

| Days | | Ounces | | | Total Weight | | |
|---|---|---|---|---|---|---|---|
| Routine Chlorination | Super Chlorination | Trichloro- isocyanuric acid | Sodium di- chloroiso- cyanurate Dihydrate | Weight Ratio | Ounces | Grams | Total Number of 15 gram tablets required |
| 2 | 1 | 2.22 | 8.9 | 1:4 | 11.12 | 315 | 21 |
| 6 | 1 | 6.67 | 8.9 | 1:1.33 | 15.57 | 440 | 29–30 |
| 8 | 1 | 8.9 | 8.9 | 1:1 | 17.8 | 505 | 33–34 |

To lengthen the time of routine chlorination beyond 8 days, a larger tablet containing more trichloroisocyanuric acid is required. However, the relatively infrequent superchlorination that would accompany larger tablets would be suitable only for pools exposed to minimum contamination and/or light swimmer loads.

The inventive contiguous, shaped-structures may contain conventional additives such as coloring matter, various dyes, perfumes and the like. Different colors may also be used in the shaped-structures of this invention such that the rapidly-soluble and slowly-soluble components are clearly distinguishable. The shaped-structures do not require fillers as do detergent tablets, even though the shaped-structures of this invention may contain fillers to increase the size of the shaped-structure to facilitate ease of handling and dispensing.

In the structure forming procedure of this invention, it has been found that the pressed material does not adhere to the dyes, and there is no capping during the pressing of the material. The term "capping" refers to the internal horizontal separation of the contiguous, shaped-structure into two or more pieces because of the adherence of these pieces to each of the dyes. The contiguous, shaped-structures may be easily removed from the die. The overall appearance of the shaped-structures is excellent, with the structures having strong corners, excellent hardness and a physically discrete contiguous-separation between the rapidly- and slowly-soluble compounds.

The contiguous, shaped-structures of this invention may be used as a source of available chlorine in treating swimming pools or in other applications which require chlorine treatment of water.

When used in swimming pools, the contiguous, shaped-structures of this invention are placed in either a pool skimmer, floating-feeder, by-pass feeder or programmed tablet feeder. Each of these methods for dispersing chlorine-releasing agents into pool water are well known.

The number of tablets added to a pool is that number which will provide for superchlorination and routine chlorination during normal pool use. The inventive contiguous, shaped-structures can provide for one day of superchlorination and numerous days of routine chlorination. When climatic conditions or heavy swimmer load result in excessive chlorine dissipation, additional contiguous, shaped-structures are merely added. Besides routine recharging of the contiguous, shaped-structure supply, an occassional test-kit check for available chlorine and pH should be performed. Little other attention is required. If the test-kit results indicate that the available chlorine is consistently increasing or decreasing, adjustment can be made by either altering the number of contiguous, shaped-structures added to the water or by changing the water supply rate through the feeders. With either a smaller supply of contiguous, shaped-structures or an increased water supply rate, care should be taken to insure that a new supply of contiguous, shaped-structures is provided before the running supply is consumed. This avoids the possibility of a low or zero available chlorine residual for even brief periods.

The following example illustrates the preparation of the contiguous, shaped-structures produced by the invention. The example is given by way of illustration, and not by way of limitation. All percentages are based upon total weight unless otherwise specified.

EXAMPLE

Contiguous, shaped-structures of sodium dichloroisocyanurate dihydrate and trichloroisocyanuric acid were prepared in the form of a layered tablet by placing 5 grams of trichloroisocyanuric acid into a Carver Laboratory Hand Press having a stainless steel die cavity. 10 grams of sodium dichloroisocyanurate dihydrate were uniformly placed into the same die cavity on top of the trichloroisocyanuric acid. A tabletting force was applied through a matting stainless steel plunger. The tabletting force or pressure applied is set forth in Table II. Tablets (1 inch diameter by ⅜ inch thick), were tested for hardness in a Strong, Cobb, Arner Hand Tester. One tablet was placed in the Hand Tester and the force necessary to crush the tablet was measured. Hardness was not tested above 25 kilograms/square centimeter because this is the normal strength required for packaging and handling. The solubility rate was measured by supporting one tablet (1 inch diameter by ⅜ inch thick) in a ½ inch stainless steel mesh cage which was suspended in 1 liter of swirling distilled water at 20°C. The time required for the tablets to completely dissolve and escape from the mesh cage was measured. Results are set forth in Table II.

TABLE II

| Tabletting Pressure (P.S.I.) | Tablet Appearance | Hardness (Kg) | Solubility Sodium di- chloroiso- cyanurate di- hydrate (min.) | Tri- chloro- isocyanuric acid (hrs.) |
|---|---|---|---|---|
| 5,000 | Easy removal from die porous physically discrete layers | >25 | 0.5 | 6.5 |

TABLE − Continued

| Tabletting Pressure (P.S.I.) | Tablet Appearance | Hardness (Kg) | Solubility Sodium dichloroisocyanurate dihydrate (min.) | Trichloroisocyanuric acid (hrs.) |
|---|---|---|---|---|
| 10,000 | Easy removal from die less porous physically discrete layers | >25 | 1.5 | 8.0 |
| 15,000 | Easy removal from die non-porous physically discrete layers | >25 | 8 | 9.5 |
| 20,000 | Easy removal from die non-porous physically discrete layers | >25 | 15 | 10 |
| 25,000 | Easy removal from die non-porous layers nearly indistinguishable | >25 | 35 | 9 |

As indicated above, sodium dichloroisocyanurate dihydrate is employed as the rapidly-soluble compound in the shaped-structures of this invention. The term "sodium dichloroisocyanurate dihydrate" means a hydrated sodium dichloroisocyanurate containing 14.1 percent by weight water of hydration. Hydrated sodium dichloroisocyanurate containing less than 14.1 percent by weight water of hydration may be mixed with the dihydrate in minor concentrations and used in the process of the invention.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A structurally-strong, storage-stable, contiguous, layered-tablet consisting essentially of a layer of rapidly-soluble chlorine-releasing sodium dichloroisocyanurate dihydrate and another layer of slowly-soluble chlorine-releasing trichloroisocyanuric acid.

2. A structurally-strong, storage-stable, contiguous, shaped-structure consisting essentially of an inner core of slowly-soluble chlorine-releasing trichloroisocyanuric acid and an outer layer of rapidly-soluble chlorine-releasing sodium dichloroisocyanurate dihydrate.

* * * * *